(12) United States Patent
Shimada et al.

(10) Patent No.: US 8,160,454 B2
(45) Date of Patent: Apr. 17, 2012

(54) METHOD AND APPARATUS FOR VISIBLE LIGHT COMMUNICATION USING SINGLE LIGHT SOURCE

(75) Inventors: Shigehito Shimada, Chiba (JP); Katsuyoshi Suzuki, Soka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 491 days.

(21) Appl. No.: 12/486,551

(22) Filed: Jun. 17, 2009

(65) Prior Publication Data
US 2010/0028021 A1 Feb. 4, 2010

(30) Foreign Application Priority Data
Jul. 30, 2008 (JP) ................................ 2008-196165

(51) Int. Cl.
*H04B 10/00* (2006.01)
(52) U.S. Cl. ......... 398/170; 398/172; 398/169; 398/130
(58) Field of Classification Search .................. 398/118, 398/121, 124, 125, 127, 128, 130, 135, 138, 398/140, 151, 169, 170, 183, 172
See application file for complete search history.

(56) References Cited

U.S. PATENT DOCUMENTS

| 6,493,123 | B1 * | 12/2002 | Mansell et al. ............... | 398/169 |
| 7,317,876 | B1 * | 1/2008 | Elliott ........................... | 398/170 |
| 7,889,997 | B2 * | 2/2011 | Won .............................. | 398/169 |
| 2002/0060825 | A1 | 5/2002 | Weigold et al. | |
| 2002/0167701 | A1 | 11/2002 | Hirata | |
| 2008/0107419 | A1 | 5/2008 | Won | |

FOREIGN PATENT DOCUMENTS

| GB | 2 186 457 | 8/1987 |
| JP | 01-122220 | 5/1989 |
| JP | 01-272237 | 10/1989 |
| JP | 06-112902 | 4/1994 |
| JP | 06-265835 | 9/1994 |
| JP | 06-289340 | 10/1994 |
| JP | 11-068129 | 3/1999 |
| JP | 11-088264 | 3/1999 |
| JP | 2000-022637 | 1/2000 |
| JP | 2002-190778 | 7/2002 |
| JP | 2002-202741 | 7/2002 |
| JP | 2002-290335 | 10/2002 |
| JP | 2004-221747 | 8/2004 |
| JP | 2007-274580 | 10/2007 |

OTHER PUBLICATIONS

European Search Report dated Nov. 27, 2009, for European Patent Application No. 09162845.3 (8 pages).
J. Gao, "Optical Retroreflector-based Sensor Networks for In-Situ Science Applications," IEEE Aerospace Conference 2003, vol. 3, Mar. 8, 2003, pp. 3-1295 through 3-1302.

(Continued)

*Primary Examiner* — M. R. Sedighian
(74) *Attorney, Agent, or Firm* — Finnegan, Henderson, Farabow, Garrett & Dunner, L.L.P.

(57) ABSTRACT

Disclosed herein is a visible-light communication system according to one embodiment of the invention. The system comprises two apparatus. One apparatus emits a visible light beam on which is superimposed transmission data. From the void data represented by the visible light beam, the other apparatus generates a retroflected light beam, superimposes transmission data on the retroflected light beam, and applies the retroflected light beam to the apparatus. On receiving the retroflected light beam, the apparatus identifies the transmission data coming from the other apparatus, on the basis of the identification data superimposed on the retroflected light beam.

15 Claims, 5 Drawing Sheets

OTHER PUBLICATIONS

Notification of Reasons for Rejection mailed Jun. 22, 2010, from the Japanese Patent Office for Japanese Patent Application No. 2008-196165 (3 pages).

Notification of Reasons for Rejection mailed Jun. 22, 2010, from the Japanese Patent Office for Japanese Patent Application No. 2008-235140 (2 pages).

European Search Report dated Nov. 13, 2009, for European Patent Application No. 09163464.2 (7 pages).

U.S. Appl. No. 12/491,318, entitled "System for Visible Light Communication Using Single Light Source," filed Jun. 25, 2009 (23 pages).

* cited by examiner

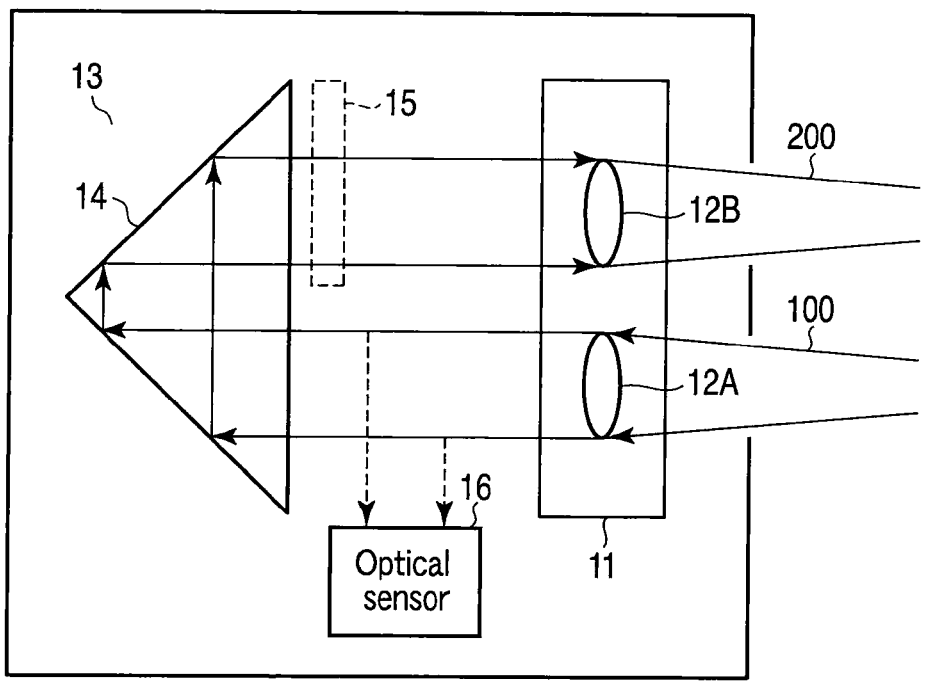
F I G. 6
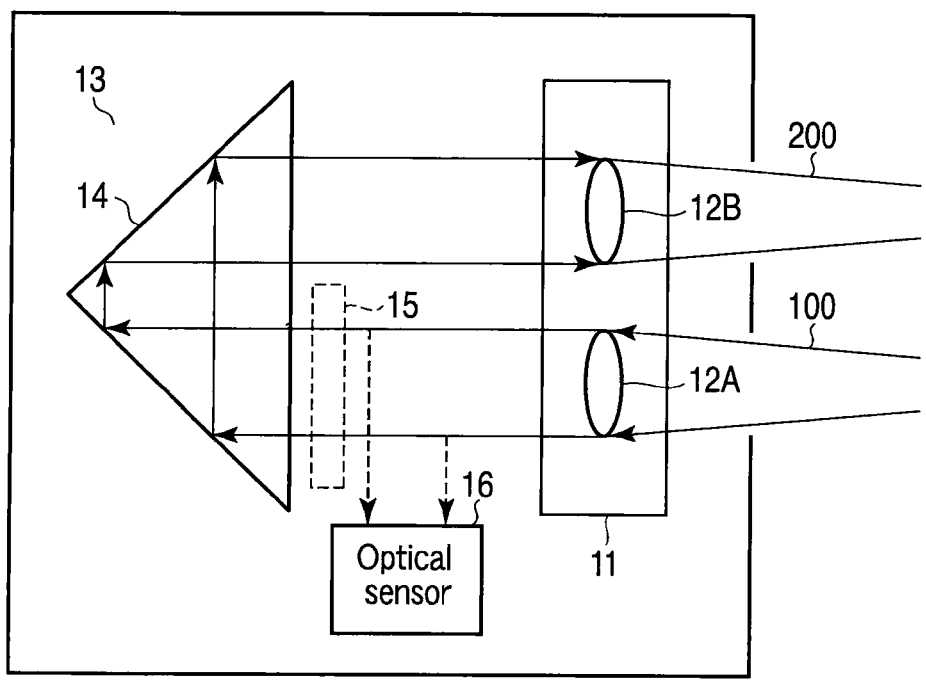
F I G. 7

METHOD AND APPARATUS FOR VISIBLE LIGHT COMMUNICATION USING SINGLE LIGHT SOURCE

CROSS-REFERENCE TO RELATED APPLICATIONS

This application is based upon and claims the benefit of priority from prior Japanese Patent Application No. 2008-196165, filed Jul. 30, 2008, the entire contents of which are incorporated herein by reference.

BACKGROUND OF THE INVENTION

1. Field of the Invention

The present invention relates to a visible-light communication technique that achieves bidirectional visible-light communication.

2. Description of the Related Art

In recent years, the development of visible-light communication technology has progressed, which utilizes the visible light emitted from a light source such as a light emitting diode (hereinafter occasionally referred to as an "LED"). The visible light coming from the light source reaches a receiving side, while it is diverging. It is inevitably difficult for the receiving side to detect the position of the light source with high accuracy and to return the visible light to the transmitting side, while focusing the light at the transmitting side. This is why unidirectional communication is performed in the visible light communication, from the transmitting side to the receiving side. (See, for example, Jpn. Pat. Appln. KOKAI Publication No. 2002-202741).

In order to accomplish bidirectional communication using visible light, it is proposed that a hybrid system be utilized, in which the visible light communication is combined with infrared-ray communication wherein the light hardly diverges. With the hybrid system, however, the infrared-ray source must be manually or automatically controlled and the visible-light emitting side must have a focusing mechanism for focusing the infrared rays before emitting them. If provided with an infrared-ray source and such a focusing mechanism, the hybrid system will be a bidirectional communication system of complex configuration and high manufacturing cost.

A single-light-source system having two communication apparatuses is proposed, in which one apparatus has a light source that emits visible light and the other apparatus reflects the visible light, thereby transmitting data to the first-mentioned apparatus. (See, for example, Jpn. Pat. Appln. KOKAI Publication No. 2004-221747). The single-light-source system needs to have neither an infrared-ray source nor a focusing mechanism. It can therefore provide a bidirectional communication system that has a simple configuration and can be manufactured at low cost. Moreover, the other apparatus need not have a power supply for a light source and can be used as a mobile terminal of low power consumption.

The single-light-source system can indeed achieve bidirectional, visible light communication using communication apparatus, such as a mobile terminal of low power consumption. If data is transmitted by the use of reflected light, however, a communication trouble, such as interference, will occur because the visible light emitted from the transmitting side has data superimposed on it in the single-light-source system.

BRIEF SUMMARY OF THE INVENTION

An object of this invention is to accomplish reliable bidirectional, visible light communication by using an apparatus that has a single light source and is therefore simple in configuration.

An aspect of the present invention provides an apparatus for visible light communication that uses a single light source and has the function of identifying transmission data to superimpose on a visible light beam.

The apparatus comprises: a light reception unit configured to receive a visible light beam which is emitted from a communication partner object and on which is superimposed first transmission data containing data and identification data identifying the first transmission data; a reception unit configured to demodulate the first transmission data from the visible light beam; a control unit configured to generate second transmission data containing identification data distinguishing the second transmission data from the first transmission data, when the first transmission data is determined to be significant data on the basis of the identification data; and a transmission unit configured to modulate a retroflected light beam generated from the light beam received by the light reception unit, with the second transmission data, and to transmit the retroflected light beam, when the first transmission data is determined to be invalid data on the basis of the identification data.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a block diagram showing the configuration of a visible-light communication apparatus according to another embodiment of the invention; and FIG. 7 is a block diagram showing the configuration of a visible-light communication apparatus according to still another embodiment of the invention.

DETAILED DESCRIPTION OF THE INVENTION

Embodiments of this invention will be described with reference to the accompanying drawings.

(Configuration of the Visible Light Communication System)

Figure 1:
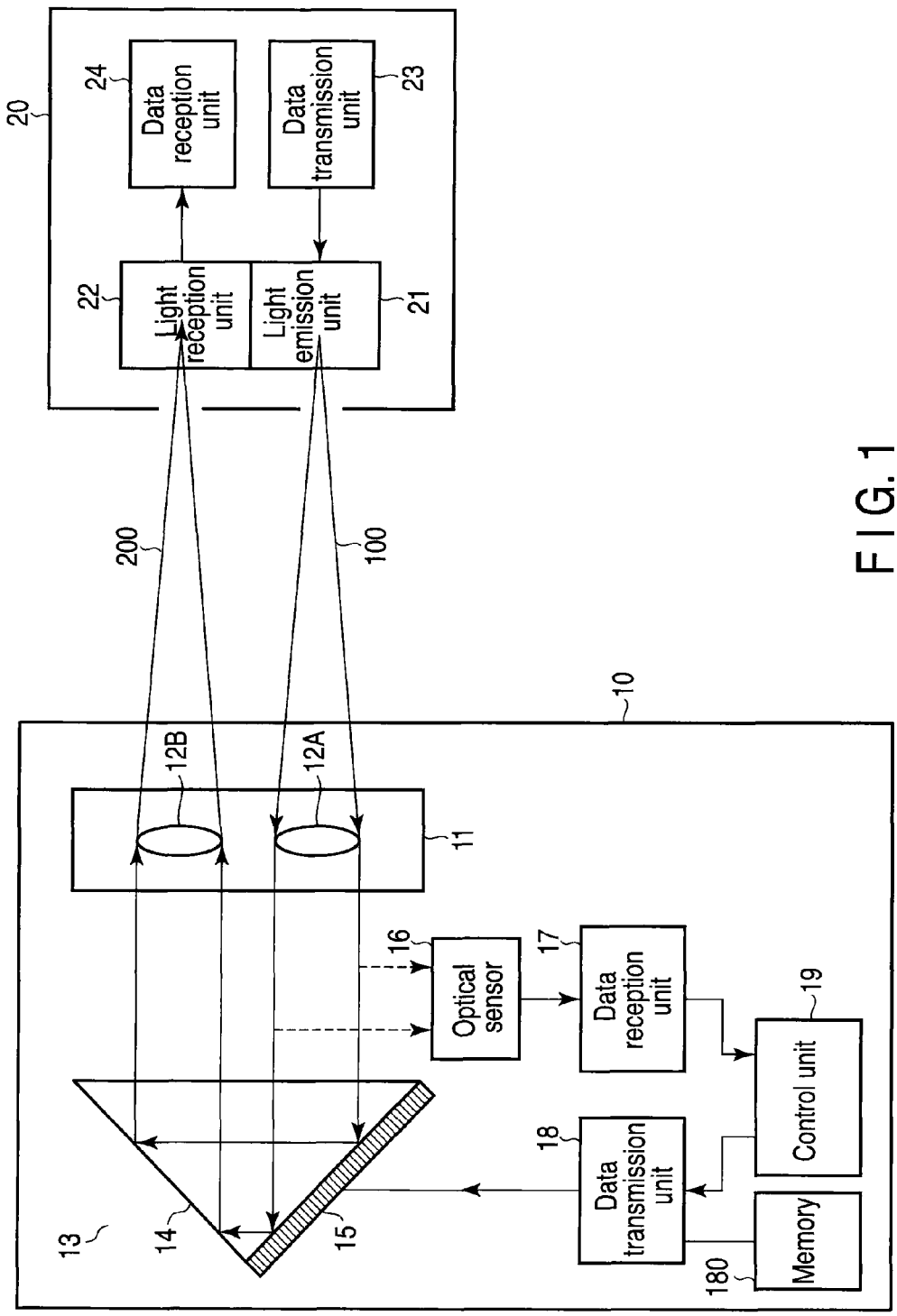
FIG. 1 is a block diagram explaining the configuration of a visible light communication system according to an embodiment of the present invention.

FIG. 1 is a block diagram explaining the configuration of a visible-light communication system according to an embodiment of the present invention. As shown in FIG. 1, the visible-light communication system has a visible-light communication apparatus 10 and another visible-light communication apparatus 20. Using visible light, bidirectional communication is accomplished between the communication apparatuses 10 and 20.

In the present embodiment, the visible-light communication apparatus 10 is a communication device incorporated in, for example, a cellular telephone. The apparatus 10 will hereinafter be referred to as the "mobile terminal 10" for convenience. The other apparatus 20 is a communication device that is incorporated in, for example, an illumination apparatus secured to the ceiling of a building. The apparatus 20 will hereinafter be referred to as the "visible-light communication device 20" for convenience.

The visible-light communication device 20 comprises a light emission unit 21, a light reception unit 22, a data transmission unit 23, and a data reception unit 24. The light emission unit 21 has a light source and an LED driver. The light source is an LED, and the LED driver drives the LED. The light emission unit 21 emits a visible light beam 100 that is modulated, that is to say on which is superimposed the data output from the data transmission unit 23. (For convenience, this data will occasionally be referred to as "first transmission data"). The data transmission unit 23 is connected to a network (not shown). The unit 23 can therefore receive data via the network from a data source such as a server. From the data supplied from the server, the data transmission unit 23 generates data, which should be transmitted from the visible-light communication device 20.

The light reception unit 22 has an optoelectronic transducer unit that receives a visible light beam 200. The light reception unit 22 converts the beam 200 into an electrical signal. The electrical signal is output to the data reception unit 24. The data reception unit 24 demodulates the electrical signal output from the light reception unit 22, thereby extracting the data superimposed on the visible light beam 200. (For convenience, this data will occasionally be referred to as "second transmission data").

As shown in FIG. 1, the mobile terminal 10 comprises an optical input/output unit 11, a retroflection unit (hereinafter occasionally referred to as a "CCR") 13, an optical sensor 16, a data reception unit 17, a data transmission unit 18, a control unit 19, and a memory 180.

The optical input/output unit 11 has a lens set composed of two lenses 12A and 12B. The lens 12A focuses the visible light beam emitted from the visible-light communication device 20. The lens 12B focuses the retroflected light beam coming from the CCR 13. The CCR 13 has a prism 14 and an optical shutter 15. The prism 14 constitutes a corner-cube reflector. The optical shutter 15 is constituted by a liquid crystal shutter.

The optical shutter 15 changes the transmittance of the visible light coming from the optical input/output unit 11, in accordance with the data transmitted from the data transmission unit 18. The prism 14 applies the retroflected light beam 200 to the optical input/output unit 11, the beam 200 having been demodulated in accordance with the transmittance changes of the optical shutter 15. That is, the light beam 200 undergoes retroflection before it is supplied to the visible-light communication device 20 as a visible light beam on which is superimposed the data (second transmission data) supplied from the data transmission unit 18.

The optical sensor 16 receives the visible light beam 100 emitted from the visible-light communication device 20, received by the lens 12A of the optical input/output unit 11 and focused by the lens 12A. The optical sensor 16 converts the visible light beam 100 into an electrical signal. The electrical signal is output to the data reception unit 17. The data reception unit 17 demodulates the visible light beam 100, acquiring the first transmission data, as will be explained later.

Controlled by the control unit 19, the data transmission unit 18 acquires the data (i.e., second transmission data) from the memory 180 and supplies the second transmission data to the CCR 13. In the CCR 13, the optical shutter 15 changes the transmittance of the visible light beam applied to the prism 14, in accordance with the data supplied from the data transmission unit 18. The control unit 19 controls the data reception unit 17 and the data transmission unit 18 as will be described later, performing the switching of the received light beam. Further, the control unit 19 generates the second transmission data and stores the generated data in the memory 180. In this case, the control unit 19 generates, for example, the second transmission data is response data to the first transmission data that the data reception unit 17 has modulated.

(Operation of the Visible-Light Communication System)

Figure 2:
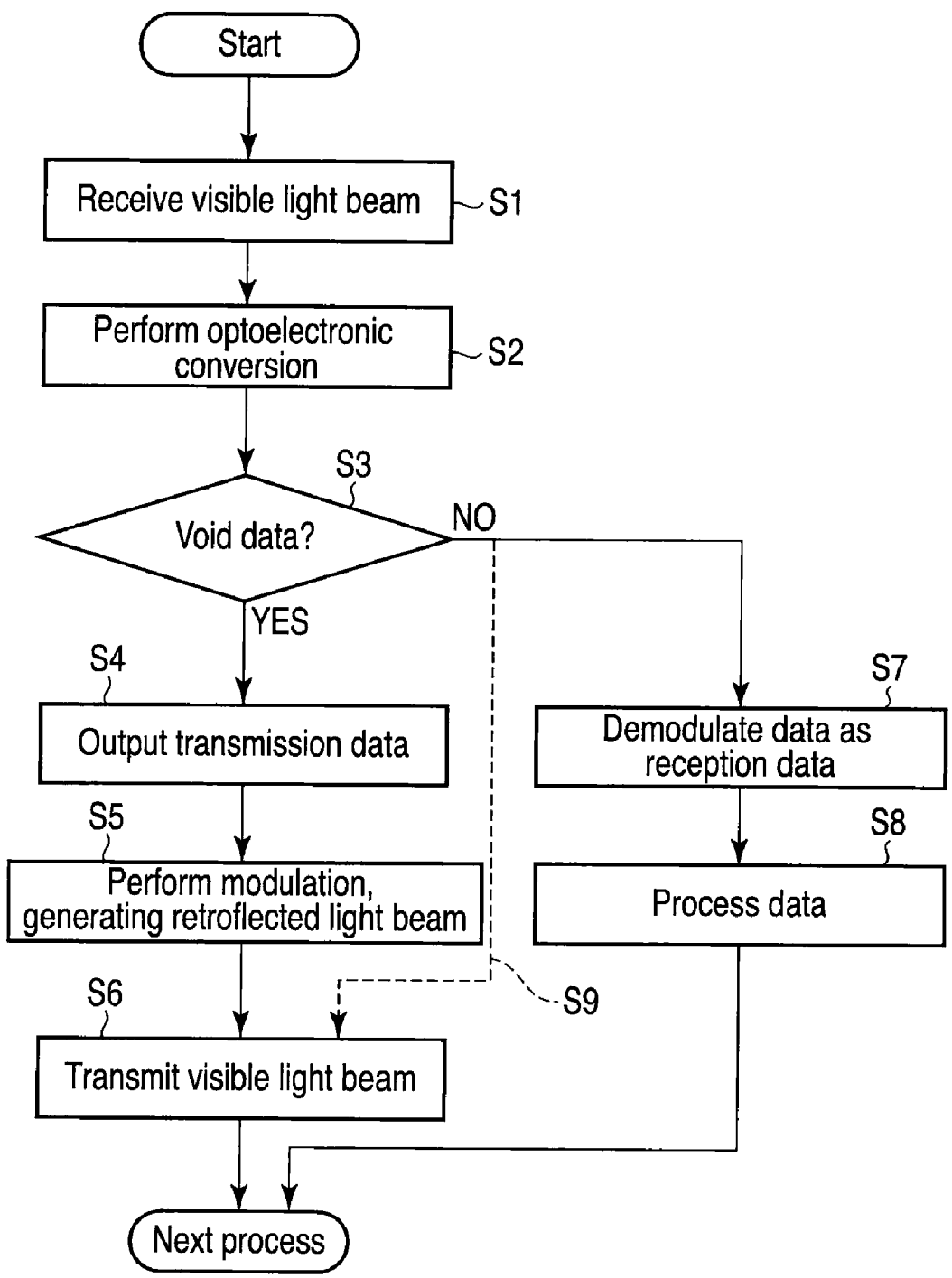
FIG. 2 is a flowchart explaining how visible light communication is performed in the system of FIG. 1.
Figure 3:
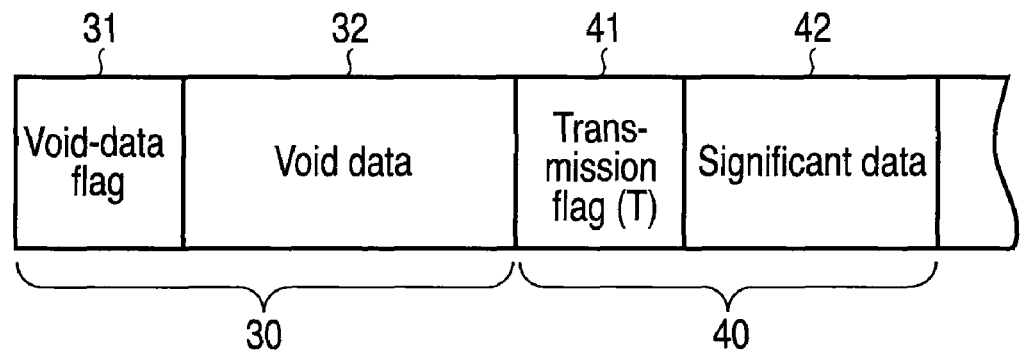
FIG. 3 is a diagram illustrating the structure of first transmission data according to the embodiment.
Figure 4:
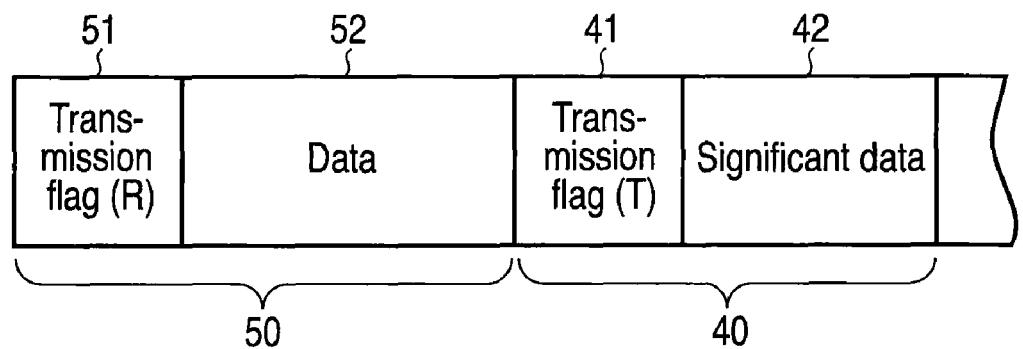
FIG. 4 is a diagram illustrating the structure of second transmission data according to the embodiment.
Figure 5:
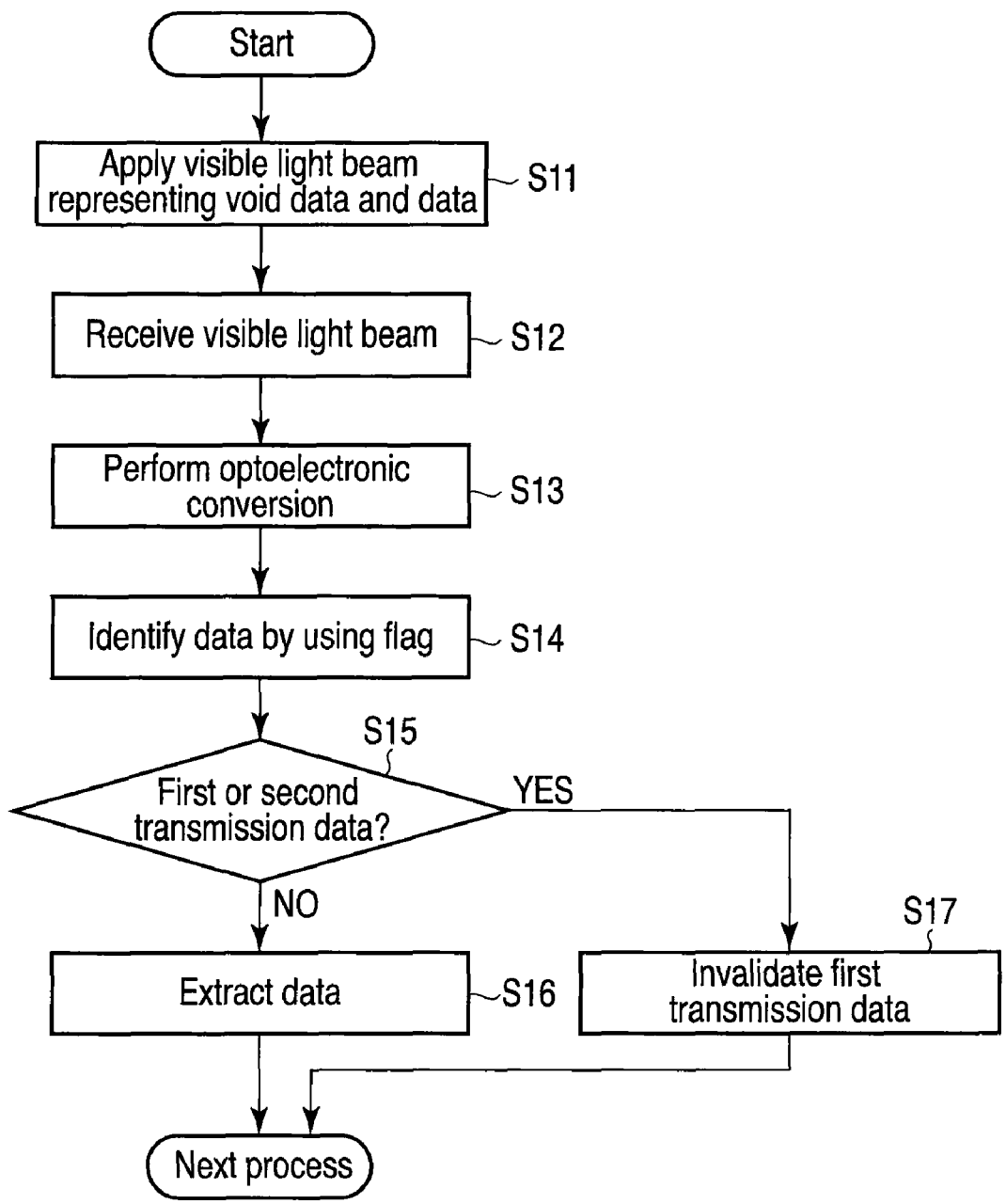
FIG. 5 is a flowchart explaining how data is received in the embodiment.

How the visible-light communication system according to this embodiment operates will be explained with reference to FIGS. 2 to 5. FIG. 2 is a flowchart explaining how the mobile terminal 10 operates in the system. FIG. 5 is a flowchart explaining how the visible-light communication device 20 operates in the system.

In the mobile terminal 10, the optical input/output unit 11 receives the visible light beam 100 emitted from the visible-light communication device 20 (Step S1). The visible-light communication device 20 transmits the first transmission data. As shown in FIG. 3, this data is time-divided, composed of two transmission data items 30 and 40. The transmission data item 30 consists of a void-data flag 31 and void data 32 (i.e., insignificant data). The transmission data item 40 consists of a transmission flag (T) 41 and significant data 42 (i.e., effective transmission data). Thus, the light emission unit 21 of the visible-light communication device 20 emits a visible light beam 100 on which are superimposed the transmission data items 30 and 40.

The transmission data items 30 and 40 are distinguished from each other with two identification flags, respectively. More precisely, the transmission data item 30 including void data 32 is identified by the void-data flag 31, and the transmission data item 40 including significant data 42 is identified by the transmission flag (T) 41.

In the mobile terminal 10, the visible light beam 100 received and focused by the lens 12A of the optical input/output unit 11 is converted into an electrical signal. The electrical signal is output to the data reception unit 17 (Step S2). The data reception unit 17 demodulates the ID data contained in the first transmission data superimposed on the visible light beam 100. The ID data demodulated is output to the control unit 19. From the ID data, the control unit 19 determines whether the transmission data is void data 32 or significant data 42 (Step S3).

If the ID data is the transmission flag (T) 41 (No in Step S3), the control unit 19 causes the data reception unit 17 to keep demodulating the significant data 42, and the significant data 42 demodulated is input to the control unit 19 (Step S7). From the demodulated significant data 42, the control unit 19 generates, for example, response data. The response data is stored in the memory 180 (Step S8). Thus, the control unit 19 stores the ID data concerning the user in the memory 180 as response data if the first transmission data coming from the visible-light communication device 20 is, for example, data inquiring about the ID data of the person who uses the mobile terminal 10.

If the ID data is the void-data flag 31 (Yes in Step S3), the control unit 19 determines that the mobile terminal 10 has received the void data 32 as the first transmission data. In this case, the control unit 19 controls the data transmission unit 18, setting the operating mode of the unit 18, from the data-receiving mode to the data-transmitting mode. The data transmission unit 18 therefore acquires data 52 from the memory 180 and generates second transmission data 50 from the data 52. The second transmission data 50 is output to the CCR 13 (Step S4). As shown in FIG. 4, the second transmission data 50 consists of a transmission flag (R) 51 and the data 52. Note that the transmission flag (R) 51 is identification data added to the data 52.

In the CCR 13, the prism 14 receives the visible light beam 100 on which is superimposed the first transmission data 30 containing the void data 32. The data transmission unit 18 turns the optical shutter 15 on or off in accordance with each bit of the second transmission data 50, changing the transmittance of the visible light beam 100 (Step S5). Therefore, the prism 14 converts the visible light beam 100 (void data) to a retroflected light beam 200 on which is superimposed the second transmission data 50.

The lens 12B of the optical input/output unit 11 receives and focuses the retroflected light beam 200 on which is superimposed the second transmission data 50. The retroflected light beam 200, thus focused, is applied from the mobile terminal 10 to the visible-light communication device 20 (Step S6). That is, the mobile terminal 10 transmits the retroflected light beam 200 on which is superimposed the second transmission data (the response data) 50, to the visible-light communication device 20.

A visible light beam 100 on which is superimposed the first transmission data 30 containing the void data 32 and a visible light beam 100 on which is superimposed the first transmission data 40 containing the significant data 42 are alternately input to the prism 14 of the CCR 13 as is illustrated in FIG. 3. Hence, the CCR 13 transmits, to the visible-light communication device 20, a retroflected light beam 200 on which is superimposed the second transmission data 50 (i.e., response data) and a retroflected light beam 200 on which is superimposed the first transmission data 40 transmitted from the visible-light communication device 20 (Step S9).

How the visible-light communication device 20 operates will be explained with reference to the flowchart of FIG. 5.

As described above, the light emission unit 21 of the visible-light communication device 20 emits a visible light beam 100 on which is superimposed the first transmission data (i.e., time-divided data) that is composed of data items 30, each containing void data 32, and data items 40, each containing significant data 42 (Step S11).

In the visible-light communication device 20, the light reception unit 22 receives the retroflected light beam 200 according to the visible light beam 100 from the mobile terminal 10 (Step S12). The light reception unit 22 converts the visible light beam 200 into an electrical signal. The electrical signal is output to the data reception unit 24 (Step S13).

The data reception unit 24 demodulates the identification data of the data superimposed on the retroflected light beam (visible light beam) 200 (Step S14). Note that the retroflected light beam 200 applied from the mobile terminal 10 has superimposed on it second transmission data 50 (i.e., response data) and the first transmission data 40. From the identification data, the data reception unit 24 determines whether the data received is the first transmission data 40 or the second transmission data 50 (Step S15).

If the identification data is the transmission flag (R) 51 (No in Step S15), the data reception unit 24 first demodulates the second transmission data 50 transmitted from the mobile terminal 10 and then extracts the data (response data) 52 from the second transmission data 50 (Step S16). The identification data may be the transmission flag (T) 41 (that is, Yes in Step S15). In this case, the data reception unit 24 determines that the data received is the first transmission data 40 the visible-light communication device 20 has transmitted, and therefore invalidates (discards) the first transmission data 40 (Step S17).

The present embodiment can thus reliably accomplish bidirectional visible-light communication between the mobile terminal 10 and the visible-light communication device 20, by utilizing a single light source (i.e., light emission unit 21) that is incorporated in the visible-light communication device 20. In other words, reliable bidirectional visible-light communication can be achieved by a simple system that needs neither an infrared-ray source nor a focusing mechanism.

To be more specific, the visible-light communication device 20 time-divides the transmission data into void data and significant data, and superimposes the void data and the significant data on a visible light beam 100. The visible light beam 100 superimposed with the transmission data is applied to the mobile terminal 10. The mobile terminal 10 receives the visible light beam 100, generates a retroflected light beam 200 that corresponds to the void data, and superimposes transmission data (i.e., second transmission data) on the retroflected light beam 200. The light beam 200 on which is superimposed the transmission data is applied to the visible-light communication device 20. Note that the transmission data (i.e., second transmission data) applied from the mobile terminal 10 contains identification data (i.e., transmission flag R) different from the identification data (i.e., transmission flag T) contained in the transmission data (i.e., first transmission data) the mobile terminal 10 has received.

The visible-light communication device 20 first receives, from the mobile terminal 10, not only a retroflected light beam 200 on which is superimposed the data generated in the mobile terminal 10 (i.e., second transmission data), but also a retroflected light beam 200 on which is superimposed the data it has generated (i.e., first transmission data), and then demodulates both retroflected light beams 200. The visible-light communication device 20 can therefore identify the first transmission data and the second transmission data, based on the identification data items contained, respectively, in the demodulated transmission data items.

Hence, in the system according to this embodiment, the visible-light communication device 20 can invalidate the transmission data (i.e., first transmission data) superimposed on the retroflected light beam 200 as the received data in order to perform bidirectional visible-light communication by utilizing the visible light beam coming from the single light source (i.e., light emission unit 21) and the retroflected light beam 200 generated from the visible light beam. Therefore, the mobile terminal 10 and the visible-light communication device 20 can reliably identify and received the transmission data coming from each other.

As described above, the mobile terminal 10 transmits the response data stored in the memory 180, when it receives the visible light beam 100 on which is superimposed the void data. Nonetheless, the mobile terminal 10 may transmit not the response data, but other data superimposed on the retroflected light beam 200 that has been generated from the visible light beam 100. Further, the data transmission unit 18 of the mobile terminal 10 may transmit not the transmission data stored in the memory 180, but the transmission data generated by the control unit 19 and superimposed on the retroflected light beam 200.

In the embodiment described above, the mobile terminal 10 is a communication device that uses the retroflected light beam 200, thus transmitting data. The embodiment is, however, not limited to this. The mobile terminal 10 may be a visible-light communication device mounted in, for example, a vehicle. In this case, the visible-light communication device, which communicates with the car-mounted communication device and which corresponds to the visible-light communication device 20, may be a stationary data transmitter mounted on the road lamp post and configured to transmit traffic information as well. In this case, too, a bidirectional visible-light communication system can be provided.

Other Embodiments

FIGS. 6 and 7 are diagrams showing two other embodiments of this invention, respectively.

In the embodiment described above, the optical shutter 15 of the CCR 13 is arranged on the reflecting side of the prism 14 as shown in FIG. 1, so that it may demodulate the retroflected light beam coming from the prism 14 with the transmission data.

Instead, the optical shutter 15 may be arranged on the output side the prism 14 as shown in FIG. 6. Alternatively, the optical shutter 15 may be arranged on the input side the prism 14 as illustrated in FIG. 7.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for visible light communication, comprising:
a light reception unit configured to receive a visible light beam which is emitted from a communication partner object and on which is superimposed first transmission data containing data and identification data identifying the first transmission data;
a reception unit configured to demodulate the first transmission data from the visible light beam;
a control unit configured to generate second transmission data containing identification data distinguishing the second transmission data from the first transmission data, when the first transmission data is determined to be significant data on the basis of the identification data; and
a transmission unit configured to modulate a retroflected light beam generated from the light beam received by the light reception unit, with the second transmission data, and to transmit the retroflected light beam, when the first transmission data is determined to be invalid data on the basis of the identification data.

2. The apparatus according to claim 1, further comprising a memory configured to store the second transmission data, wherein the transmission unit includes:
a retroflection unit configured to generate the retroflected light beam from the visible light beam received by the light reception unit; and
a modulation unit configured to modulate the retroflected light beam with the second transmission data acquired from the memory.

3. The apparatus according to claim 2, wherein the retroflection unit includes an optical shutter configured to change the transmittance of the retroflected light beam in accordance with the second transmission data.

4. The apparatus according to claim 2, wherein the light reception unit outputs the visible light to the reception unit and applies the visible light beam to the retroflection unit.

5. The apparatus according to claim 1, wherein the control unit configured to generate response data corresponding to the significant data, as the second transmission data, when the reception unit receives the significant data as the first transmission data.

6. The apparatus according to claim 2, wherein the control unit configured to generate response data corresponding to the significant data, as the second transmission data, and to store the response data in the memory.

7. The apparatus according to claim 1, wherein the light reception unit receives visible light beams in a time-division fashion, on each of which is superimposed the significant data and the invalid data as the first transmission data; and the transmission unit modulates the retroflected light beam with the second transmission data and applies the retroflected light beam, at timing of receiving the visible light beam that corresponds to the invalid data.

8. A system for visible light communication between a first apparatus and a second apparatus, the system comprising:
a light emission unit provided in the first apparatus and configured to emit a visible light beam on which is superimposed first transmission data containing identification data identifying significant data or invalid data, or both; and
a light reception unit provided in the second apparatus and configured to receive the visible light beam emitted from the light emission unit,
wherein the second apparatus includes:
a reception unit configured to demodulate the first transmission data from the visible light beam;
a control unit configured to generate second transmission data containing identification data identifying the data as the first transmission data, when the first transmission data is determined to be significant data on the basis of the identification data; and
a transmission unit configured to modulate a retroflected light beam generated from the light beam received by the light reception unit, with the second transmission data, and to transmit the retroflected light beam, when the first transmission data is determined to be invalid data on the basis of the identification data.

9. The system according to claim 8, wherein the light emission unit emits visible light beams in a time-division fashion, on each of which is superimposed the significant data and the invalid data as the first transmission data; and in the second apparatus, the control unit processes the first transmission data is the significant data and generates the second transmission data, and the transmission unit modulates the retroflected light beam generated from the visible light beam corresponding to the invalid data with the second transmission data and transmits the retroflected light beam.

10. The system according to claim 8, wherein in the second apparatus, the transmission unit includes:
a retroflection unit configured to generate the retroflected light beam from the visible light beam received by the light reception unit; and
a modulation unit configured to modulate the retroflected light beam with the second transmission data.

11. The system according to claim 8, wherein the second apparatus includes a memory configured to store the second transmission data, and the transmission unit includes:

a retroflection unit configured to generate the retroflected light beam from the visible light beam received by the light reception unit; and a modulation unit configured to modulate the retroflected light beam with the second transmission data acquired from the memory.

12. The system according to claim 8, wherein the first apparatus includes:

a light reception unit configured to receive the retroflected light beam from the transmission unit of the second apparatus; and a reception unit configured to demodulate data from the retroflected visible light beam and to process the second transmission data, as received data, on the basis of identification data contained in the demodulated data.

13. The system according to claim 8, wherein the first apparatus includes a unit configured to invalidate the first transmission data on the basis of identification data contained in the demodulated data, when the reception unit receives the first transmission data.

14. The system according to claim 12, wherein the first apparatus includes a unit configured to invalidate the first transmission data on the basis of identification data contained in the demodulated data, when the reception unit receives the first transmission data.

15. A method of visible light communication between a first apparatus and a second apparatus, the method comprising:

emitting from the first apparatus a visible light beam on which is superimposed first transmission data containing significant data or invalid data and identification data identifying the significant data or the invalid data;

receiving at the second apparatus the visible light beam emitted from the first apparatus;

demodulating the first transmission data from the visible light beam;

generating second transmission data containing identification data distinguishing the second transmission data from the first transmission data, when the first transmission data is the significant data on the basis of the identification data; and modulating a retroflected light beam generated from the light beam received, with the second transmission data, and to transmit the retroflected light beam, when the first transmission data is determined to be invalid data.

* * * * *